(No Model.) 2 Sheets—Sheet 2.
H. STANLEY.
CLUTCH.
No. 534,978. Patented Feb. 26, 1895.
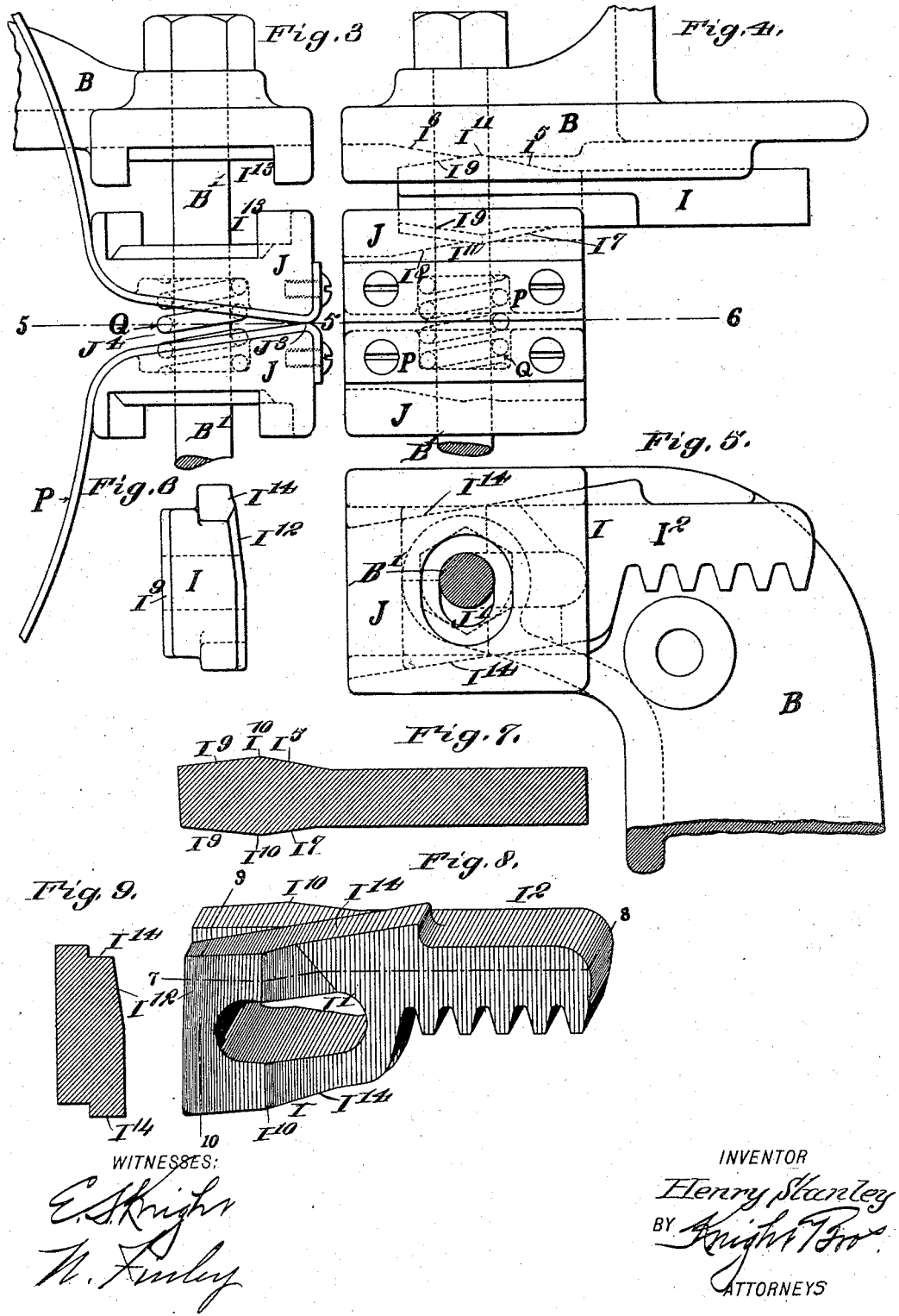
WITNESSES:
E. S. Knight
N. Finley
INVENTOR
Henry Stanley
BY Knight Bro.
ATTORNEYS

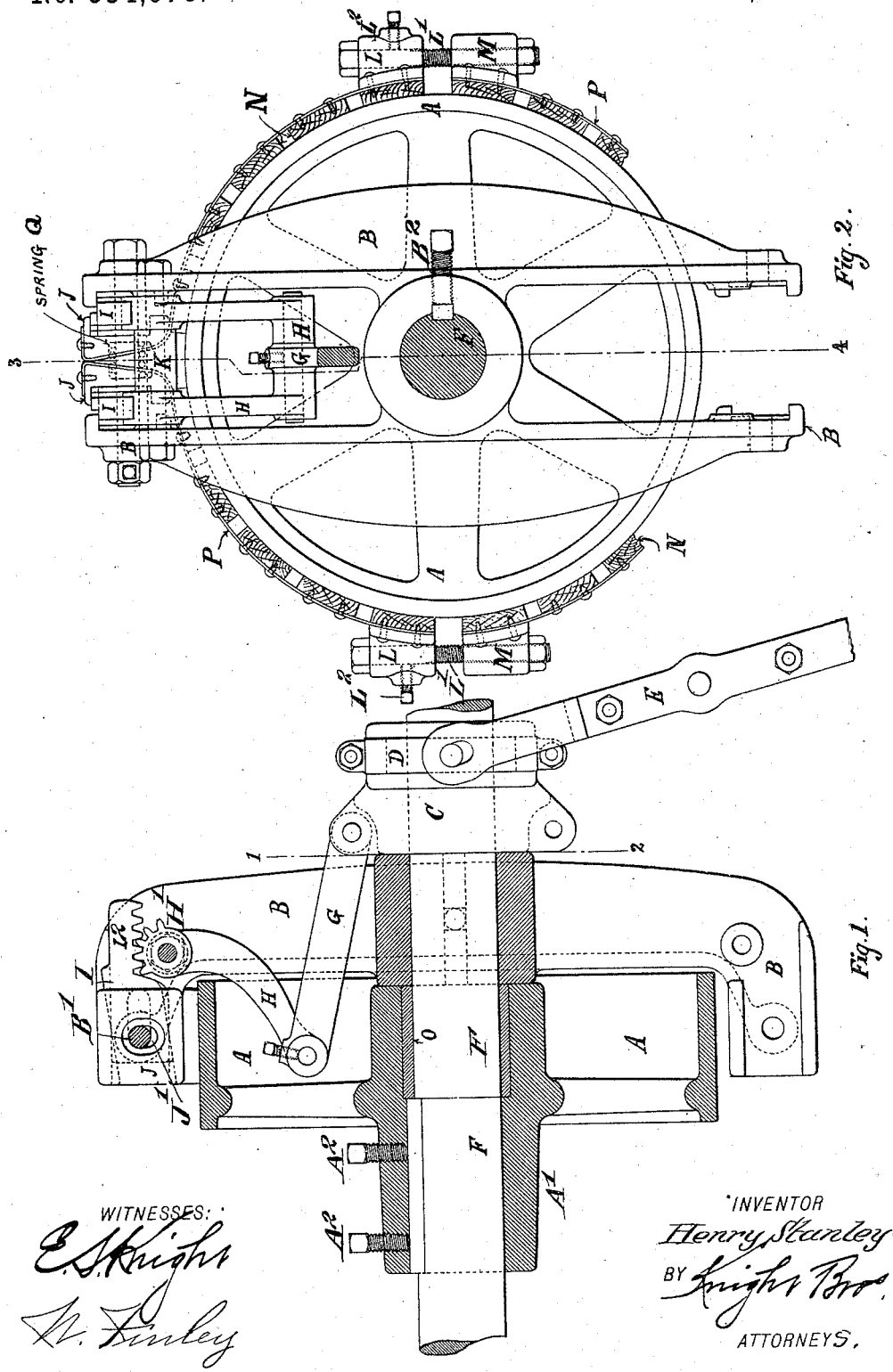

UNITED STATES PATENT OFFICE.

HENRY STANLEY, OF ST. LOUIS, MISSOURI, ASSIGNOR, BY MESNE ASSIGNMENTS, TO ANNIE MARGARET STANLEY, OF SAME PLACE.

CLUTCH.

SPECIFICATION forming part of Letters Patent No. 534,978, dated February 26, 1895.

Application filed October 29, 1894. Serial No. 527,276. (No model.)

*To all whom it may concern:*

Be it known that I, HENRY STANLEY, of the city of St. Louis, in the State of Missouri, have invented a certain new and useful Improvement in Clutches, of which the following is a full, clear, and exact description, reference being had to the accompanying drawings, forming part of this specification.

My invention relates to an improved device that may be used as a coupler clutch or as a pulley clutch.

My invention consists in features of novelty hereinafter fully described and pointed out in the claims.

Figure 1 is illustrative of my invention, part in section and part in elevation, the section being taken on line 3—4 Fig. 2. Fig. 2 is a section taken on line 1—2 Fig. 1. Fig. 3 is an enlarged detail side view. Fig. 4 is an enlarged detail top view. Fig. 5 is a section taken on line 5—6, Fig. 4. Fig. 6 is an end view of one of the cam wedges. Fig. 7 is a longitudinal section of one of the wedges, taken on line 7—8, Fig. 8. Fig. 8 is a perspective view of one of the wedges. Fig. 9 is a transverse view of one of the wedges, taken on line 9—10, Fig. 8.

Referring to the drawings, F represents the adjacent ends of two shafts onto one of which is fitted the hub $A'$ of a rim A, the hub being made fast to the shaft by set screws $A^2$, or otherwise. The end of the other shaft is shipped into the hub $A'$ with a bushing O between them if desired. On this latter shaft is secured a spider or arm B made fast to the shaft by a set screw $B^2$ or otherwise. Back of the spider or arm on the shaft is a collar C that is made to turn with the shaft but is free to be moved longitudinally of the shaft. It has a circumferential groove in which loosely fits a strap D connected to an operating lever E by which the collar is moved lengthwise of the shaft.

P represents the friction band surrounding the rim A and preferably lined with cross strips N of wood or other suitable material. This band is made in sections connected by blocks L and M through which pass bolts $L'$ for adjusting the size of the band originally and for adjusting it as it becomes worn. The bolts $L'$ may be held from turning, when adjusted, by jam screws $L^2$.

I will now describe the mechanism for tightening the band on the rim, to which my invention relates. Each end of the arm or spider B is forked and through each end is passed a bolt or rod $B'$. Fitting on this bolt at each end of the arm, are two blocks J, the openings $J'$ in the blocks, through which the bolts $B'$ pass, being somewhat elongated as shown in Fig. 5, so as to allow the blocks to move slightly toward and away from the rim as the band is tightened and loosened. There are also fitting on each bolt $B'$ two cam wedges I, one between each block J and the end of the arm B. The openings $I'$ in the wedges through which the bolts $B'$ pass, are elongated, (see Fig. 8) so that the wedges can be moved to tighten and loosen the band, and the openings are of such length that their respective ends come against the bolt when the wedge is moved its complete distance in either direction, so that the distance the wedge moves is definite and certain, so that the lever E meets with positive resistance at the limit of the movement of the wedges in either direction and the operator cannot fail to fully apply or to fully release the band if he moves the lever each time as far as it will go.

Each wedge I is formed with an extended end $I^2$ having teeth or cogs on its lower surface providing a rack that is engaged by a toothed segment $H'$ on a lever H connected by a link G to the collar C. There is a lever H with its segment $H'$ for each wedge I and there is a pair of the wedges I at each end of the arm or spider. When the collar C is moved, the links G with the levers H act as toggles to move the wedges. When the wedges are in their operative position, see Fig. 1, the point of connection between the links G and the levers H is inside of the pivots of the levers so that the centrifugal motion tends to keep the wedges in this position rather than to move them back and loosen them. Then when the wedges are moved to their inoperative position and the band loosened, the joint between the levers and links is moved back of the pivots of the levers H so that the centrifugal motion tends to hold the wedges in their inoperative position.

The ends of the strap P are made fast to the blocks J as shown in Fig. 3. The inner faces of the blocks are formed so that when their outer ends meet as shown at $J^3$ Fig. 3, a space $J^4$ will be left between the blocks forward of this point.

Each wedge has an inclined surface $I^5$ that rides against an inclined surface $I^6$ on the arm B as the wedge is drawn into operative position, and each wedge has an inclined surface $I^7$ that rides against an inclined surface $I^8$ on its block J, as the wedge is drawn into operative position. The pair of blocks J are thus pinched together to tighten the strap, when the wedges are drawn forward. When the wedges are moved back the blocks are forced apart by a spring Q placed between them. The wedges are tapered off as shown at $I^9$ from the apex of the inclines $I^5$ and $I^7$, thereby reducing the frictional surface and at the same time forming corners $I^{10}$ on the wedges that fit in depressions $I^{11}$ in the spider and blocks when the wedges are drawn entirely forward into operative position, and thus the wedges are prevented from slipping back of their own accord.

The corner of the inner end of each wedge that is farthest from the band P is inclined off as shown at $I^{12}$, the object of which is to provide for the inner ends of the blocks J to be pinched toward each other after the blocks come together at $J^3$, thus closing or partially closing the space $J^4$ and drawing the band down onto the rim at these points. The bevels at $I^{12}$ leave the wedges thicker below the point (Figs. 8 and 9) than they are above this point and thus the inner ends of the blocks are moved farther than the outer ends to close the space $J^4$ as stated.

The blocks and the arm or spider are recessed as shown at $I^{13}$ to receive the wedges, and to move the blocks back away from the rim at the time they open out, so that the band will be entirely removed from the face of the rim when the latter is released. I form the parts of the wedges that fit in the recesses $I^{13}$ of the blocks with surfaces $I^{14}$ that are on an angle to the length of the opening $I'$, so that as the wedges move on the bolts $B'$ and in the recesses $I^{13}$ of the spider, the blocks are moved toward and away from the rim as well as being moved toward and away from each other. This movement of the blocks to and from the rim is permitted by the elongation of the openings $J'$ already referred to.

The shape of these wedges and blocks, with the other parts, form a very powerful and effective clutch that can be applied equally well to couplers or pulleys.

It is evident that my invention might be carried out to a certain extent by using only the inclines $I^5$ and $I^6$, or those $I^7$ and $I^8$, the two omitted being substituted by plain straight bearing surfaces, but I prefer to use both pairs of inclines as it gives a greater movement to the blocks with the same movement to the wedges, and the same angle of the inclines.

I claim as my invention—

1. In a clutch, the combination of a band, blocks secured to the band and having inlines $I^8$, an arm, wedges fitting between the arm and the blocks and having inclines $I^7$, means for forcing the blocks apart when the wedges release them and means for moving the wedges, substantially as set forth.

2. In a clutch, the combination of a band, blocks secured to the band and having inclines $I^8$, an arm having inclines $I^6$, wedges fitting between the arm and the blocks and having inclines $I^5$ and $I^7$, means for forcing the blocks apart when the wedges release them and means for moving the wedges, substantially as set forth.

3. In a clutch, the combination of a band, blocks secured to the band and having inclines $I^8$ and depressions $I^{11}$, an arm having inclines $I^6$ and depressions $I^{11}$, wedges fitting between the arm and the blocks and having inclines $I^5$, $I^7$ and $I^9$, and means for moving the wedges, substantially as set forth.

4. In a clutch, the combination of a band, blocks secured to the band and having inclines $I^8$, an arm having inclines $I^6$, wedges fitting between the arm and the blocks and having inclines $I^5$ and $I^7$, means for moving the wedges, and a spring Q substantially as and for the purpose set forth.

5. In a clutch, the combination of a band, blocks secured to the band and having inclines $I^8$, an arm, wedges fitting between the arm and the blocks and having inclines $I^7$ and elongated openings $J'$, a bolt passing through said arm, wedges and blocks, and means for moving the wedges, substantially as and for the purpose set forth.

6. In a clutch, the combination of a band, blocks secured to the band and having inclines $I^8$, an arm, wedges fitting between the arm and the blocks and having inclines $I^7$, and means for moving the wedges, consisting of racks formed on the wedges, segments engaging the racks, pivoted levers on which the segments are formed, a sliding collar and links connecting the collar to said levers, said parts being so disposed that the point of connection between the links and levers will pass beyond the pivot point of said levers when the wedges are in their respective operative and inoperative positions, substantially as and for the purpose set forth.

7. In a clutch, the combination of a band, blocks secured to the band and having inclines $I^8$, an arm, wedges fitting between the arm and the blocks and having inclines $I^7$ and $I^{14}$, and means for moving the wedges, said blocks being provided with recesses $I^{13}$ to receive the wedges, and having elongated openings J', substantially as and for the purpose set forth.

8. In a clutch, the combination of a band, blocks secured to the band and having inclines $I^8$, an arm, wedges fitting between the arm and the blocks and having inclines $I^7$ and inclines $I^{12}$, and means for moving the wedges, substantially as and for the purpose set forth.

HENRY STANLEY.

In presence of—
 STUART E. FREEMAN,
 GEO. H. KNIGHT.